United States Patent [19]

Deglin et al.

[11] 4,127,745
[45] Nov. 28, 1978

[54] DATE TIME-MULTIPLEX SWITCHING NETWORK FOR USE IN A TELECOMMUNICATIONS EXCHANGE

[75] Inventors: Rene' Deglin, Velizy-Villacoublay; Françoise Crapet, Maurepas, both of France

[73] Assignee: Compagnie Industrielle des Telecommunication Cit-Alcatel S.A., Paris, France

[21] Appl. No.: 780,394

[22] Filed: Mar. 23, 1977

[30] Foreign Application Priority Data

Mar. 31, 1976 [FR] France .................................. 76 09390

[51] Int. Cl.² .............................................. H04J 3/02
[52] U.S. Cl. ............................................... 179/15 BA
[58] Field of Search ............ 179/15 A, 15 BA; 178/3, 178/50

[56] References Cited

U.S. PATENT DOCUMENTS

| 3,333,051 | 7/1967 | Schramel | 178/50 |
| 3,636,524 | 1/1972 | Holland | 179/15 BA X |
| 3,804,987 | 4/1974 | Cooper | 179/15 A |
| 3,826,872 | 7/1974 | McGregor | 179/15 A |
| 3,855,422 | 12/1974 | Cadiou et al. | 179/15 BA X |

Primary Examiner—Thomas W. Brown
Attorney, Agent, or Firm—Sughrue, Rothwell, Mion, Zinn and Macpeak

[57] ABSTRACT

A time-multiplex connection network comprising an inlet stage and an outlet stage to which transmission lines are connected, and a switching stage. It constitutes a modular network with a matrix structure, in which the West-East lines represent modules, each comprising:
 line equipment for a group of subscribers
 inlet storage serving the line equipment
 a switching sub-group pertaining to each group in the switching stage
 interfaces with control logic and signalling equipment.

8 Claims, 5 Drawing Figures

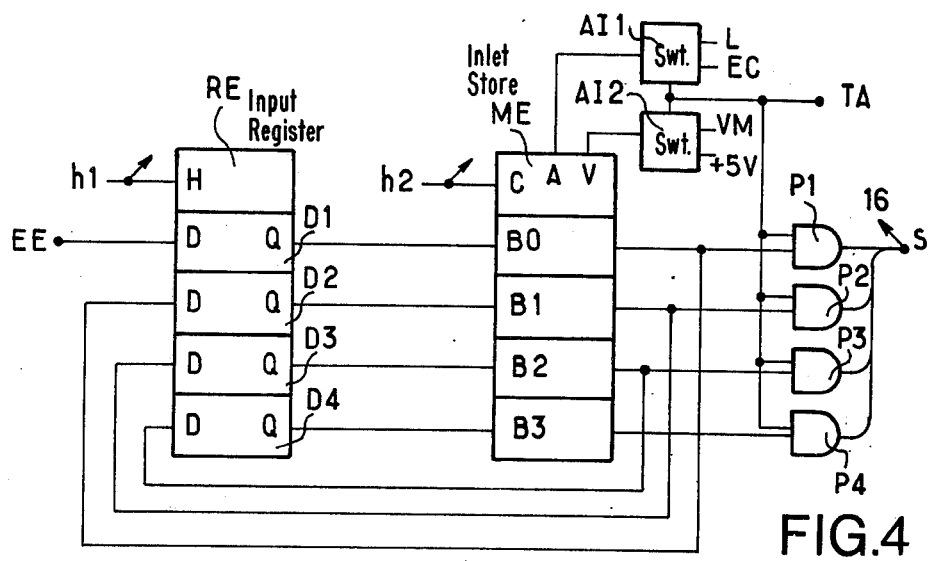
FIG.4
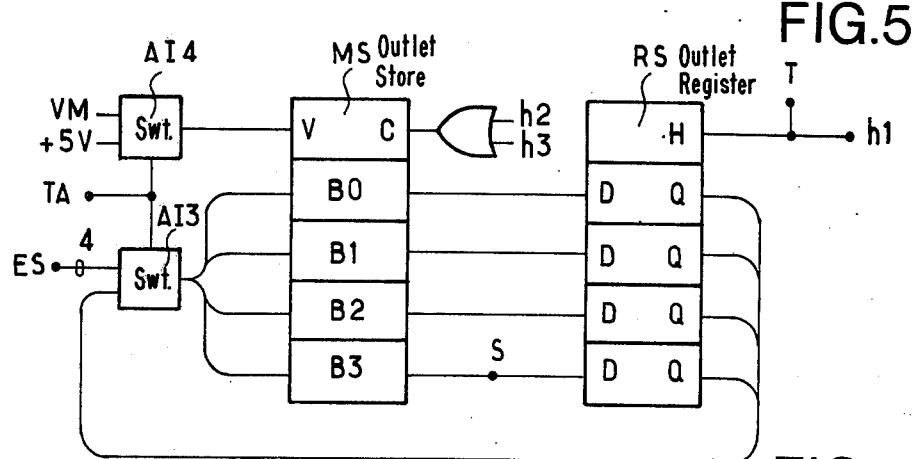
FIG.5
FIG.3
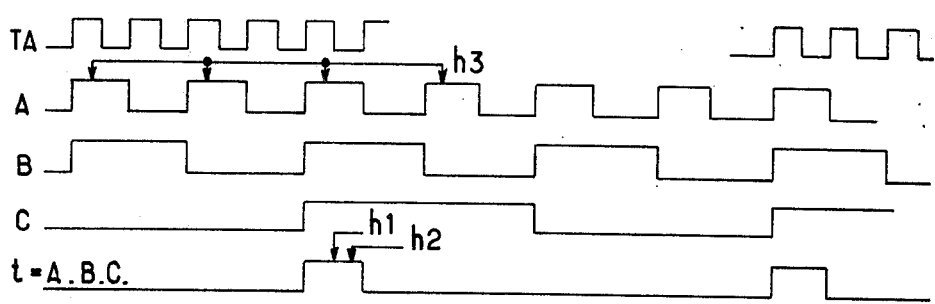

DATE TIME-MULTIPLEX SWITCHING NETWORK FOR USE IN A TELECOMMUNICATIONS EXCHANGE

This invention relates to a time-multiplex connection network suitable for use in telecommunications, and more particularly in telegraph exchanges.

Several "time multiplex" connection systems are known in telegraphy, time multiplex being particularly suitable for the connection of telegraph signals since these are in some form of pulse modulation code. In known systems involving code recognition for retransmission, the unit of intelligence connected through an exchange represents at least one character, and possibly several.

One feature of the invention is the constitution of a connection network, in which code elements appearing at inlets are sampled at time intervals which are short in comparison with the duration of the telegraph code elements, so that the time-distortion introduced by the connection process is small. Such an exchange is said to be "transparent" in that it transfers signals from its inlets to its outlets without any processing of the signals transferred in the exchange itself. A transparent exchange can thus switch mixed kinds of telegraph codes of any data rate below a maximum determined by the sampling process and the amount of sampling distortion which is tolerable. The structure and word capacity of the exchange hardware are not directly related to the form of telegraph code switched.

The samples are formed into "blocks" of pulses at the inlet to the connection network, the maximum sampling rate is determined by technology, and pulse block length is determined to obtain the maximum line-connection capacity.

The connection network is composed of an inlet stage and an outlet stage, to which the lines are connected, and a switching stage. The network is modular and is structurally a matrix, of which the West-East lines represent modules, each comprising:

- the equipment of a number of lines pertaining to a subscriber line group;
- the inlet-outlet storages serving said line equipment;
- a switching sub-group pertaining to each group in switching stage;
- interfaces with switching control logic and signalling equipment, and in which the North-South lines represent the switching stage groups, each comprising one sub-group per "West-East" module mentioned above, and one bus "vertically" connecting said sub-group.

Inter-group communication is on busses between the subscriber line group and the switching sub-groups pertaining to the same module, and inter-module communication is on busses between the modules.

The network is entirely modular; addition of a module does not affect the network already provided, but requires incrementation of the storage (i.e. memory) of the network control, which may also have an expandable modular configuration.

A further feature of the invention is its handling of selection signals by registers pertaining to system logic, contained in each module and connected to the inlet and outlet stages like subscriber line equipment, whereby each such register has access to and is accessible from every line connected to the network.

According to a further feature of the invention, storage addressing is multiplexed. "Write" addresses are supplied by a clock-piloted addresser, and "read" addresses are obtained from a marking memory loaded by the network control logic.

The following is a description of one embodiment of the invention, given here by way of example and with reference to the accompanying drawings in which:

FIG. 3 is a wave-form diagram of control signals employed;

FIG. 4 is a block diagram of an inlet storage subassembly; and

FIG. 5 is a block diagram of an outlet storage subassembly.

The connection network described in this example (FIG. 1) comprises $m$ modules M1 to Mm, each comprising line equipment TG, one inlet store ME and one outlet store MS, each having a capacity of 256 four-bit words and thus permitting the connection of 224 lines and 32 logic register units. The switching stage proper comprises $n$ groups G1 to Gn. A group such as G1 comprises, in each module, one sub-group composed of an input memory MA1 and an output memory MB1, interconnected by a bus BL1 serving the corresponding sub-group in each module via interfaces IC.

In each module, an output S of the inlet store ME is connected by a bus to the input E of each input memory MA1 to MAn. Likewise, the input E of the outlet store MS is connected by a multiple bus BS to the outputs S of all output memories MB1 to MBn.

Signal transfers on busses BE, BS, BL1 to BLn are performed on four wires, in blocks of 4 bits in parallel.

The marshalling of incoming signals and their distribution to outlets are performed by interfaces MDXI, each of which comprises an input multiplexer MXE and an output demultiplexer DXS, which are described further on.

The marking of paths through the network from the inlet stores ME to the outlet stores MS is performed by marking stores MQE, MQ1+O, MQn, and MQS supplying "read" address respectively to the inlet stores ME, and to the input and the output memories MA1 to MAn, MB1 to MBn. There are three marking operations per path:

marking in the marking store MQE having a capacity of $n \times p$ 8-bit words of the "read" address for an inlet store ME, where $p$ is the number of words per input memory MA1 to MAn;

marking in the marking stores MQ1 (to MQn) each having a capacity of $n \times p$ x-bit words, of the "read" address for a memory MA1 (to MAn), where $x$ is the number of bits required to address $m \times p$ words, and $m$ is the number of memories MB1 in the one group; and

- marking inthe marking stores MQS having a capacity of 256 $y$-bit words, where $y$ is the number of bits required to address $n \times p$ words.

These "read" addresses and the "write" addresses for marking the MQ marking stores are supplied by a computer via connecting logic LX.

Figure 2:
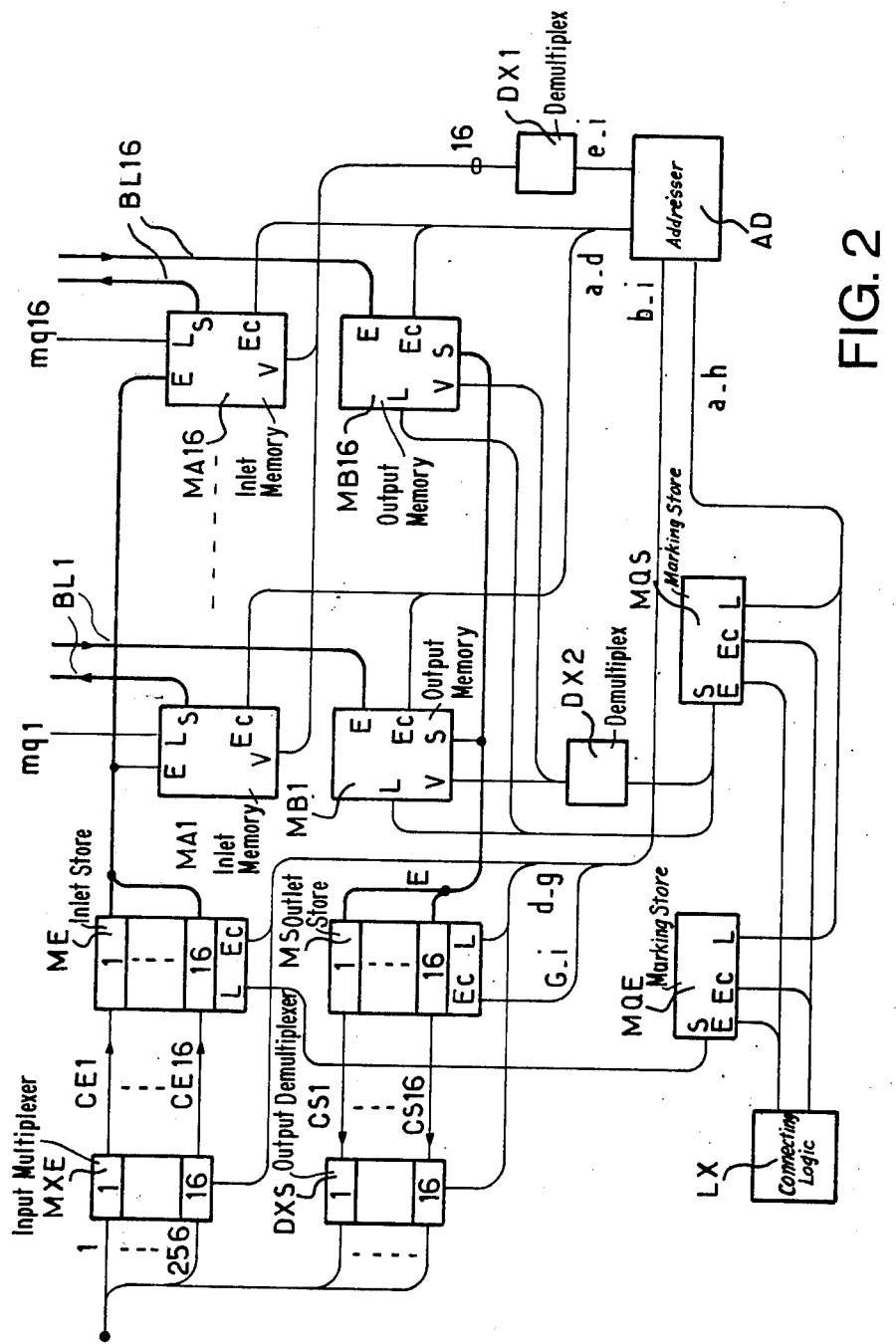
FIG. 2 illustrates the organization of one module, assuming that there are 16 switching stage groups.

The remaining addresses, i.e. the "write" addresses for the inlet stores ME and the input and the output memories MA1 - MAn, MB1 - MBn, and the "read" addresses of the marking memories MQ, and both the "read" and the "write" addresses of the outlet store MS and the multi/demultiplexing interfaces MDX1 - MDXm, are supplied by a clock-driven addresser AD (FIG. 2).

Addressing modes are selected at the input of each storage/memory by a switching device shown in FIGS. 4 and 5.

Figure 1:
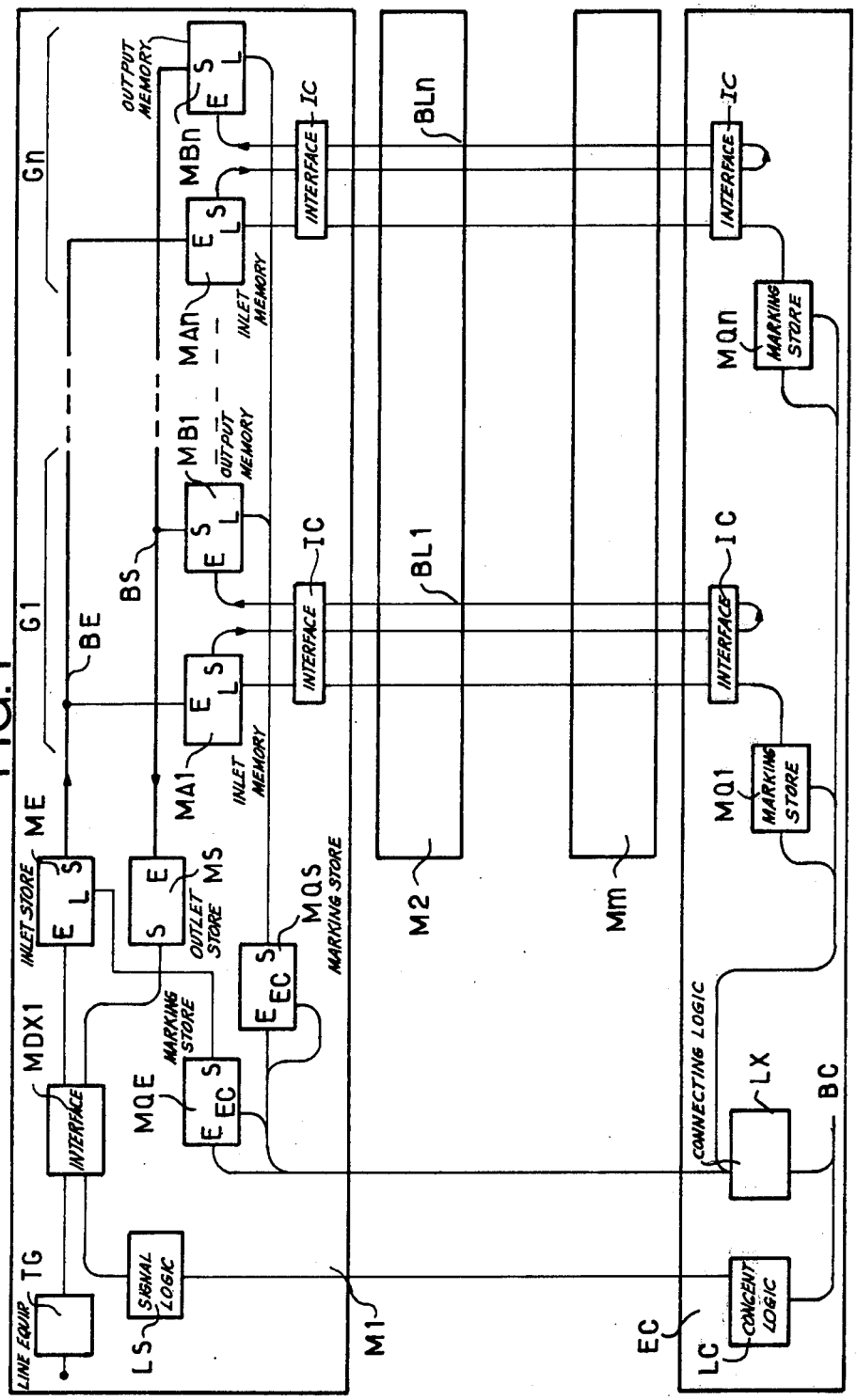
FIG. 1 is a general diagram of the time-multiplex connection network.

FIG. 1 further shows a signalling logic unit LS in each module. The signalling logic units LS comprise both logic registers (for party number data) connected to the connection network like line equipment, and line equipment control logic circuits for call supervision. There are also concentration logic circuits LC, located in common equipment EC, which interface the central control circuit with the signalling logic units LS.

FIG. 2 shows the detail of one of the modules M1 to Mn, together with that of the part of common equipment EC associated with the module. This detail is particular to a system comprising 16 modules and 16 switching groups, and would be different for other configurations falling within the general scheme of FIG. 1. Group capacity is in this case 512 lines: the addresser AD thus delivers 512 nine-bit addresses, transmitted in parallel on wires a-i at the fixed rate of one every 1.5 μs, a complete addressing cycle thus taking 768 μs.

To load 4-bit words into the inlet store, all calling lines are addressed at 192 μs intervals, using bit positions D,E,F,G, of the addresser AD (wires d to g).

The connection network thus introduces a phase distortion of 192 μs maximum in relation to the instants of changes in the incoming signals. As the times stated relate to an application in telegraphy, the maximum distortion introduced for 20 ms unit code elements is always less than 1%.

A clock signal is a squarewave of 1.5 μs period having two phases: TA and $\overline{TA}$. Data is transmitted on the busses during each phase. For example, a write operation during phase TA will be followed by a read operation on the same storage/memory during $\overline{TA}$, the next memory in which the data is written during $\overline{TA}$, will be read during the next TA phase and so forth. Write addressing of the inlet store ME and read addressing of the outlet store MS occur at each 8th clock interval, i.e. for example when outputs A, B, and C of addresser AD are simultaneously "1" (FIG. 3), i.e. under the control of a signal $t$ = A.B.C.

In each module of the connection network, the input multiplexer MXE is composed of 16 memory modules, each connected to a multiplexer output by lines CE1 to CE16 (FIG. 2). A memory module of 16 four-bit words capacity is shown in FIG. 4. It comprises an input register RE composed of four D type flip-flops (D1–D4), with common clock input H. Outputs Q are connected to the inputs of the inlet store ME at bit levels B0 - B3 and the outputs of the inlet store ME are connected to the 4-wire output S, common to the 16 memory modules, through gates P1 to P4, which are enabled at read instant TA. Input EE of flip-flop D1 is connected to the output of the corresponding multiplexer by one of the lines CE1 to CE16, and the inputs of flip-flops D2, D3, D4 are driven from outputs B0, B1, B2 of the storage, so that the contents of RE are shifted through in steps coinciding with write operations.

Store addressing is through a switch AI1, which is controlled by the signal TA for selection of the read or write address L or EC, while a second switch AI2, also controlled by TA, enables write access to the storage module at TA = 0 by applying + 5V to all modules, or read access by applying enabling voltage to one module only, addressed by marking store MQE (signal VM).

Clocking of RE (input H) is at instant $h1$ in the time-interval defined by coincidence of $t$ = 1 and TA = 0. Write enabling of storage ME (input C) is at instant $h2$, which follows $h1$ in the same time-interval.

The store MS is analogous in structure but operates in the reverse direction of data flow (FIG. 5). Input ES of a memory module drives the outlet store MS through a switch A13, and the 4-wire output of the outlet store MS is connected to an outlet register RS. Output S of the memory module towards an output line CS1–CS16 is obtained at output B3 of the outlet store MS. The output of the outlet register RS is fed back to the input of the switch A13 with one shift of the binary "weight" on each wire. Enabling of the outlet store modules is precisely as in the case of the inlet store, through a switch A14, which will enable one module only (signal VM), at write instant TA = 1, or all modules (+ 5V signal) at read instant TA = 0.

Write input C of the outlet store MS is "opened":
  either by the signal $h1$: at this instant the switch A14 is passing +5V to enable all modules, and the switch A13 set to recycle the shift register counter, which therefore shifts at the same rate as the signal $t$.
  or by a signal $h3$, in the time-interval defined by coincidence of TA = 1 and A = 1, this defines writing through input ES in one module only, at 4 times the rate of the signal $t$.

In addition to its modularity, the network according to the invention is easily adapted to provide widely differing capacity ranges. For example, with the technology and organization described above, which provide switching group memory capacities of 512 words in 16 memories of 32 words each, it is possible to multiply the capacity of an exchange by 16, using the following equipment, the network remaining non-blocking:
- 128 modules (128 × 224 connected lines)
  group storage capacity composed of 128 4-word memories (hence still of 512 words)
  128 switching groups, providing a storage capacity of 512 words for the sub-groups of one module. 512 paths are in fact necessary for non-blocking (congestion-free) provision of 256 two-way paths.

Conversely, in very low capacity applications, requiring no more than one module, the switching group memories may be dispensed with, and the inlet stores directly connected to the outlet stores.

In the case of very large exchanges, in particular, the length of cabling between module racks and switching group racks is more than will permit simultaneous reading of inlet storages and writing in sub-group memories MA1–MAn. In such cases, a buffer register may be connected at the output of each inlet store ME.

What we claimed is:
1. A time multiplex modular connection network for use in an automatic exchange serving lines carrying binary signals comprising, a memory having three memory stages, said stages addressed by address counters and marking stores, said memory stages comprising an inlet memory stage, an outlet memory stage, and a selection memory stage, said selection memory stage divided into n selection groups, each module of said network comprising a number of line equipment, an inlet store and an outlet store serving said lines, and each of the n selection groups comprising a sub-group in each module having an input memory and an output memory, the connections between memory stages of the network comprising, in each module, an inlet bus between the output of the inlet store and the input of the input memory of each sub-group pertaining to said module and an outlet bus between the input of the outlet store and the output of the output memory of the sub-group of the module, said connections between memory stages of the network further comprising each of the n selection groups having a connecting bus between the output of each of said input memories of the group and the input of each of the output memories of the same group.

2. A network according to claim 1, of the nonblocking type, in which one communication path is set up in each direction between calling and called line equipment, and in which the total capacities of the input memories plus the output memories connected to the same module are respectively at least equal to twice the capacities of inlet stores and outlet stores.

3. A network according to claim 1, in which the binary signals are switched and successively travel on the inlet bus of the module to which a calling line is connected, the connecting bus of the selected selection group, and the outlet bus of the module which is connected to a called line, whenever the inlet and the outlet store addressing is multiplexed, the read address of each memory feeding to one of the busses being registered in a marking store, and the write address of each memory receiving data from a bus being supplied by an addresser.

4. A network according to claim 3, in which the calling lines are connected to an input multiplexer stage comprising several multiplexers in each module of the network, in which the inlet stores are divided into as many memory modules as there are multiplexers, the outlet of each multiplexer being connected by respective lines to the input of a memory module, and in which one set of addressing wires is parallel-connected to all multiplexers and a write addressing circuit of each memory module, while read addressing is performed at a faster rate and selects each memory module separately.

5. A network according to claim 4, in which called lines are connected to an output multiplexer stage comprising several demultiplexers in each module of the network, in which outlet stores are divided into as many memory modules as there are demultiplexers, the input of each demultiplexer being connected by respective lines to the output of a memory module, and in which a set of addressing wires is parallel-connected to all demultiplexers and to the read addressing circuit of all the storage modules, while write addressing is performed by a distributor at a faster rate and selects each memory module separately.

6. A network according to claim 5, capable of switching words of $k$ bits from inlet stores to outlet stores, wherein the connecting buses have the same number $k$ of wires, the input of each inlet store being connected at the output of a shift-register with parallel inputs and outputs and of a capacity of $k$ bits, communication signal samples being received at an input of said register, inputs 2 to $k$ being connected respectively to outputs 1 to $k-1$ of the store, so that each word in store contains $k$ bits in the same order as said bits were received at the input to the register.

7. A network according to claim 6, capable of switching words of $k$ bits from inlet storage to outlet storage, comprising connecting buses having the same number $k$ of wires, in which the output of each outlet store is connected at the input of a register, with parallel inputs and outputs and of capacity $k$, the data word at store input being received through a switch, either from an input connected at the input of the foregoing stage, or from the output of a register, and with a shift of one step, the most significant bit of the word being transmitted at each cycle towards the called line.

8. A network according to claim 7, wherein capacity increases are obtained by adding modules and sub-groups serving them, without involving modification of equipment common to said modules.

* * * * *